(12) United States Patent
Weber et al.

(10) Patent No.: US 11,760,239 B2
(45) Date of Patent: Sep. 19, 2023

(54) GUIDE ELEMENT COMPRISING FASTENING TO A SEAT CUSHION, SEAT CUSHION, VEHICLE SEAT AND VEHICLE HAVING A GUIDE ELEMENT OF THIS TYPE

(71) Applicant: AUDI AG, Ingolstadt (DE)

(72) Inventors: Michael Daniel Weber, Aalen (DE); Jürgen Beckett, Mömbris (DE)

(73) Assignee: AUDI AG, Ingolstadt (DE)

( * ) Notice: Subject to any disclaimer, the term of this patent is extended or adjusted under 35 U.S.C. 154(b) by 586 days.

(21) Appl. No.: 17/044,971

(22) PCT Filed: Mar. 5, 2019

(86) PCT No.: PCT/EP2019/055382
§ 371 (c)(1),
(2) Date: Oct. 2, 2020

(87) PCT Pub. No.: WO2019/206500
PCT Pub. Date: Oct. 31, 2019

(65) Prior Publication Data
US 2021/0162895 A1 Jun. 3, 2021

(30) Foreign Application Priority Data
Apr. 25, 2018 (DE) ............... 10 2018 206 398.2

(51) Int. Cl.
*B60N 2/28* (2006.01)
*B60N 2/58* (2006.01)
*B60N 2/64* (2006.01)

(52) U.S. Cl.
CPC ........... *B60N 2/289* (2013.01); *B60N 2/5816* (2013.01); *B60N 2/64* (2013.01)

(58) Field of Classification Search
CPC ..... B60N 2/2887; B60N 2/289; B60N 2/2893
See application file for complete search history.

(56) References Cited

U.S. PATENT DOCUMENTS 6,254,183 B1    7/2001 Bian
9,738,183 B2 *  8/2017 Szlag ................... B60N 2/2893
                (Continued)

FOREIGN PATENT DOCUMENTS

CN    102781720 A    11/2012
CN    202879279 U    4/2013
                (Continued)

OTHER PUBLICATIONS

Office Action dated Mar. 3, 2022, in connection with corresponding Chinese Application No. 201980028233.3 (10 pp., including machine-generated English translation).

(Continued)

*Primary Examiner* — Timothy J Brindley
(74) *Attorney, Agent, or Firm* — Maier & Maier, PLLC

(57) ABSTRACT

A ISOFIX guide element, having a base section, a rear side section, and two side sections connected to the base, an insertion opening, which is delimited by respective inner sides of the base section and the two side sections, a bracket opening formed between the base section and the rear side section which has notches formed in the side sections in such a way that a bracket-like fixing element can be accommodated in the notches, and that the fixing element is accessible through the insertion opening. It is provided here that at least one fastening element protruding from the base section is arranged on an outer side of the base section, wherein the fastening element has at least one oblong-hole-type fastening opening, which is connectable to a tab of a seat cushion or a seat cover of a vehicle seat.

8 Claims, 3 Drawing Sheets

(56) References Cited

U.S. PATENT DOCUMENTS

| | | | | |
|---|---|---|---|---|
| 11,667,220 | B2* | 6/2023 | Onji | B60N 2/2887 297/253 |
| 2017/0355285 | A1* | 12/2017 | Terada | B60N 2/68 |
| 2017/0355286 | A1 | 12/2017 | Terada et al. | |
| 2018/0022245 | A1* | 1/2018 | Fujii | B60N 2/70 297/463.1 |
| 2018/0361890 | A1* | 12/2018 | Ishizaka | B60N 2/2887 |
| 2020/0055427 | A1* | 2/2020 | Styn | B60N 2/6009 |
| 2023/0095604 | A1* | 3/2023 | Krumbein | B60N 2/6009 297/250.1 |

FOREIGN PATENT DOCUMENTS

| | | | | |
|---|---|---|---|---|
| CN | 104442467 | A * | 3/2015 | B60N 2/2887 |
| CN | 105307898 | A | 2/2016 | |
| CN | 205326854 | U | 6/2016 | |
| CN | 107472093 | A * | 12/2017 | B60N 2/28 |
| CN | 107554362 | A | 1/2018 | |
| DE | 102011002045 | A1 | 2/2012 | |
| DE | 102013010153 | A1 | 12/2014 | |
| DE | 202014008592 | U1 | 2/2016 | |
| DE | 102015221450 | A1 | 5/2017 | |
| DE | 102016213264 | A1 | 1/2018 | |
| DE | 102019114909 | A1 * | 8/2020 | B60N 2/2887 |
| EP | 3 023 294 | A1 | 5/2016 | |
| EP | 3 053 775 | A1 | 8/2016 | |
| FR | 3014043 | A1 * | 6/2015 | B60N 2/2893 |
| JP | 4346784 | B2 | 10/2009 | |
| JP | 2013060124 | A * | 4/2013 | |
| WO | 2005/087535 | A1 | 9/2005 | |

OTHER PUBLICATIONS

German Examination Report dated Jan. 25, 2019 in corresponding German Application No. 10 2018 206 398.2; 12 pages; Machine translation attached.

International Search Report (with English translation) and Written Opinion (with Machine translation) dated Jun. 4, 2019 in corresponding International Application No. PCT/EP2019/055382; 13 pages.

Notification of Transmittal of Translation of the International Preliminary Report on Patentability dated Nov. 5, 2020 in corresponding International Application No. PCT/EP2019/055382; 6 pages.

Examination Report dated Jun. 16, 2023, in corresponding German Application No. 10 2018 206 398.2, 10 pages.

* cited by examiner

GUIDE ELEMENT COMPRISING FASTENING TO A SEAT CUSHION, SEAT CUSHION, VEHICLE SEAT AND VEHICLE HAVING A GUIDE ELEMENT OF THIS TYPE

FIELD

The disclosure relates to a guide element, in particular an ISOFIX guide element, a seat cushion having such a guide element, and a vehicle seat having such a seat cushion and a vehicle having such a vehicle seat.

BACKGROUND

Such guide elements are used in vehicles in particular when fastening child seats on a vehicle seat. In this case, the guide elements are used to guide catch elements provided on a child seat in the direction of fastening brackets (ISOFIX retaining brackets), which are connected to the vehicle body of the vehicle, so that the catch elements can be locked on the fastening brackets and the child seat is securely retained. Such a fastening system for child seats is also known under the name ISOFIX.

During the manufacturing of vehicle seats, the guide elements are typically first installed when the relevant seat cushion has already been mounted in a vehicle seat. Seat cushions and guide elements are accordingly supplied separately from one another and mounted in successive work steps. The installation of the guide elements in the vehicle seat which is already assembled or mounted in the vehicle body is an additional step in the mounting sequence, which is time-consuming.

SUMMARY

The underlying object of the invention is considered that of specifying a guide element which enables improved mounting.

A guide element is thus proposed, in particular an ISOFIX guide element or ISOFIX funnel, having a base section, a rear side section, and two side sections connected to the base, having an insertion opening, which is delimited by respective inner sides of the base section and the two side sections, and having a bracket opening formed between the base section and the rear side section, which has notches formed in the side sections in such a way that a bracket-like fixing element can be accommodated in the notches, and that the fixing element is accessible through the insertion opening. It is provided here that at least one fastening element protruding from the base section is provided on an outer side of the base section, wherein the fastening element has at least one oblong-hole-type fastening opening, which is connectable to a tab of a seat cushion or a seat cover of a vehicle seat.

A tab, in particular a material tab or a tab made of a plastic fabric or the like, can be guided or threaded through the fastening opening of the fastening element, so that the guide element can be connected to the seat cushion before the mounting of the seat cushion. The seat cushion having guide elements attached thereon can accordingly be mounted in one work step, without the guide elements having to be installed later.

The fastening opening can be embodied to be essentially rectangular, wherein a length of the fastening opening is approximately four times the width of the fastening opening. For example, the length of the opening can be approximately 35-50 mm, wherein the width is approximately 9 to 12 mm.

In this way, a tab dimensioned adequately for good handling can be inserted easily into the fastening opening, so that the guide element can be connected to the seat cushion.

The notches can have a respective end section, which is dimensioned in such a way that the guide element is fixable in a formfitting and/or friction-locked way on the fixing element accommodated in the notches, in particular is fixable like a clip. In this way, during the mounting of the seat cushion having the guide elements fastened thereon by means of the tab, the guide elements can be easily connected to the bracket-like fixing elements, in particular the guide elements can easily be pressed onto the fixing elements and thus locked in the end section.

The underlying object of the invention is also achieved by a seat cushion for a seat of a vehicle, having a foam body, a support structure arranged on the foam body, and having a cover enclosing the foam body. It is provided in this case that at least one tab connected to the support structure and/or the cover is arranged on a rear region of the seat cushion, and that an above-described guide element is connected to the tab.

In this case, a free end of the tab can be wrapped in a loop around a wire of the wire mesh and then connected to the remaining tab, for example, using an eye, a hook-and-loop closure, an adhesive, or the like. Alternatively or additionally, the tab can be fastened on the cover of the cushion, for example, sewn or adhesively bonded thereon.

The seat cushion can have two tabs, which are arranged at a distance to one another along the rear region of the seat cushion, which essentially corresponds to a distance of two bracket-like fixing elements connected to a vehicle body, in particular the distance of 270 to 290 mm between two ISOFIX retaining brackets. Two guide elements can accordingly be attached to the seat cushion in order to simplify the mounting of the vehicle seat.

The tab can have a length which is dimensioned so that a free end which is guided through the fastening opening of the guide element is arranged below the base section of the guide element in the mounted state of the guide element on the seat cushion.

The invention furthermore also relates to a vehicle seat having an above-described seat cushion, which has at least one above-described guide element. Finally, the invention also relates to a vehicle having such a vehicle seat. In this case, the vehicle seat can be a front seat or a rear seat of a vehicle, in particular a front passenger seat or a left or rear or middle seat of a rear seat bench.

BRIEF DESCRIPTION OF THE DRAWINGS

Further advantages, features, and details of the invention result from the disclosure, the following description of preferred embodiments, and on the basis of the drawings. In the figures.

DETAILED DESCRIPTION

Figure 1:
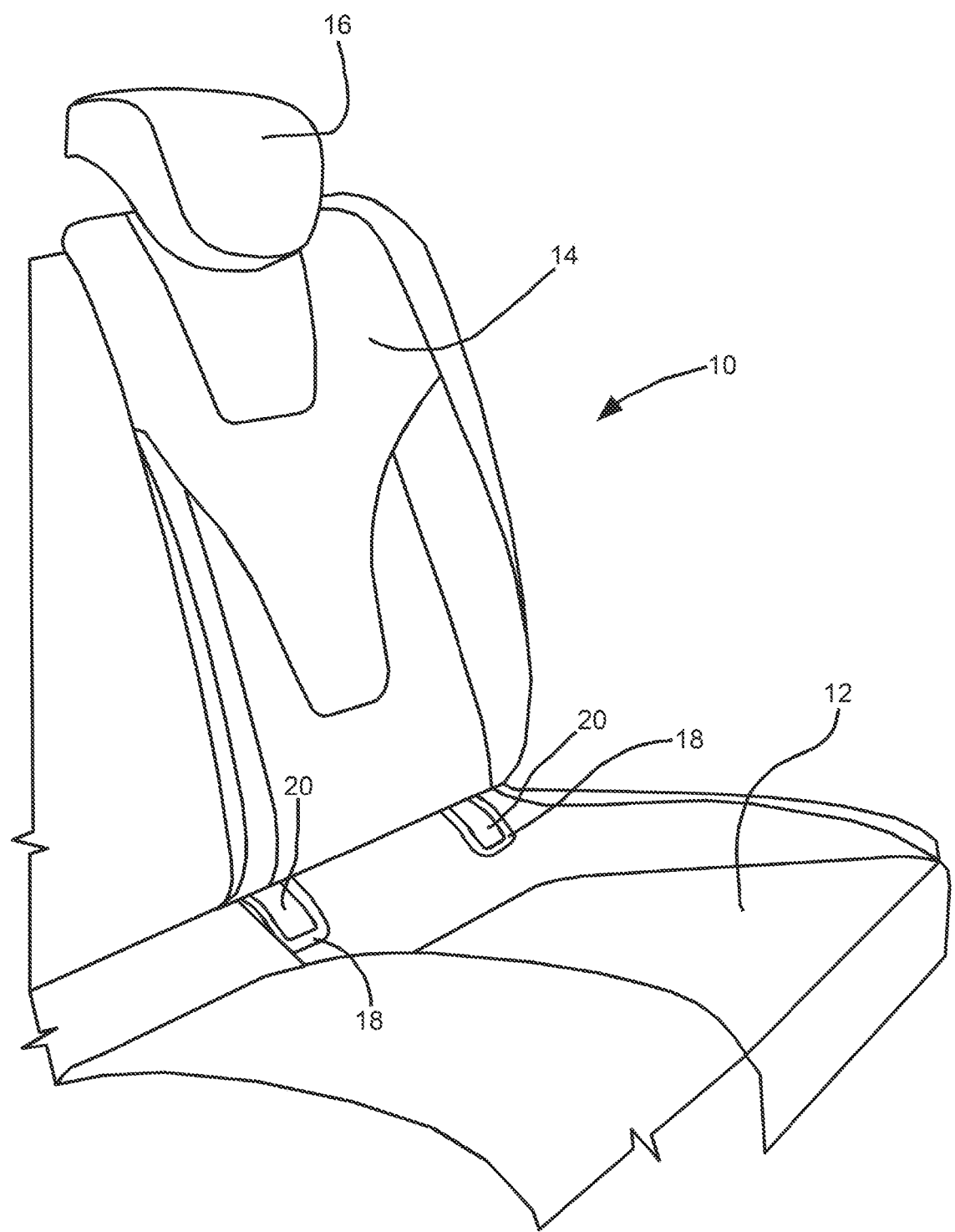
FIG. 1 shows a schematic and simplified illustration of a vehicle seat having two guide elements.

A vehicle seat 10 is shown schematically and simplified in FIG. 1. The vehicle seat 10 comprises a seat cushion 12. Furthermore, the vehicle seat 10 has a backrest 14 and a headrest 16 attached thereon. Two guide elements 18 are arranged in the seat cushion 12 in the region of the transition between the seat cushion 12 and the backrest 14. The guide elements 18 are used to enable the access to fixing elements arranged behind them, in order to be able to fasten a child seat on the vehicle seat 10. In FIG. 1, the guide elements 18 are shown having a cover element 20, which is located in its closed position, so that the fixing elements located behind it are not visible.

The vehicle seat shown in FIG. 1 is, solely by way of example, a rear left seat of a vehicle. The guide elements 18 can just as well be arranged on a front seat, in particular a front passenger seat of a vehicle, or on a right or middle seat of a rear seat bench, however.

Figure 2:
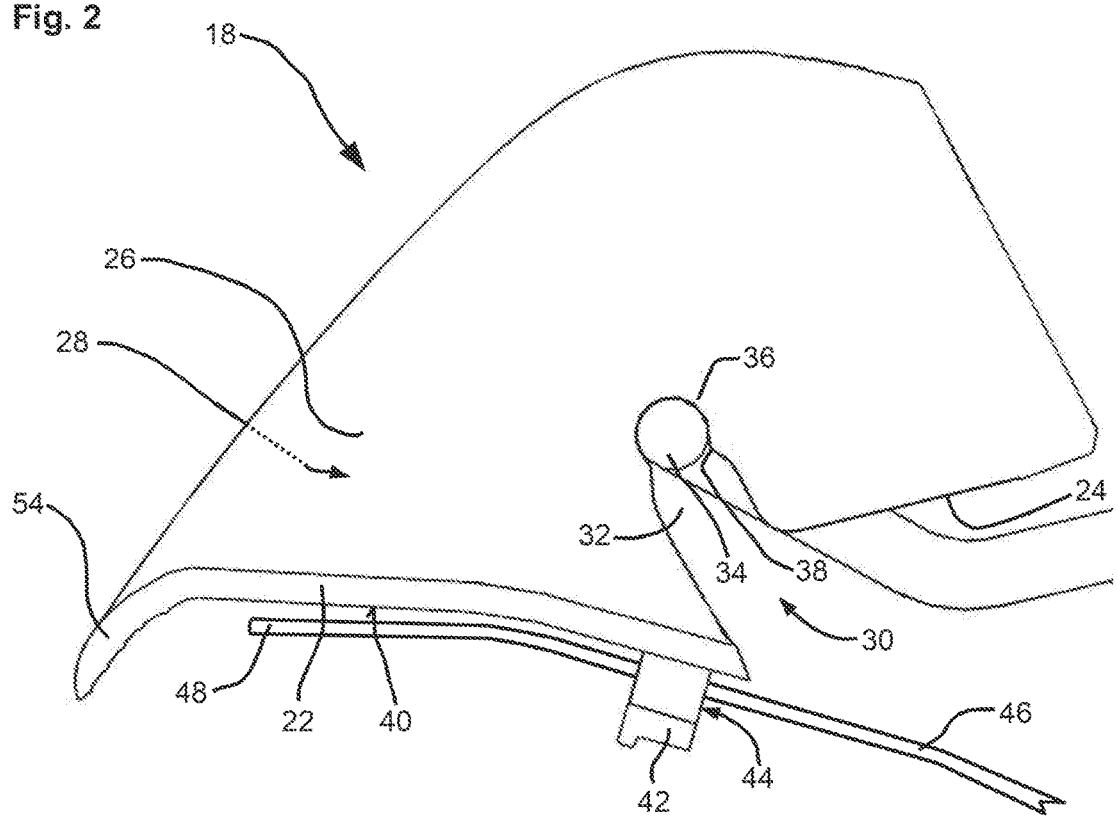
FIG. 2 shows a schematic and simplified lateral view of a guide element and a tab of a seat cushion connected thereto.

The guide element 18 is shown in FIG. 2 in a schematic lateral outline illustration. It comprises a base section 22, a rear side section 24, and two side sections 26. With respect to a mounted state shown in FIG. 1, in which an insertion opening 28 of the guide element 18 is aligned forward, in FIG. 2 the view is toward the right side section 26, which is shown transparent, however. The insertion opening 28 is delimited by the respective inner sides of the base section 22 and the two side sections 26.

The guide element 18 has a bracket opening 30 formed between the base section 22 and the rear side section 24. The bracket opening 30 has notches 30 formed in the side sections 26. In this case, the notches 32 are formed so that a bracket-type fixing element 34 can be accommodated therein, so that the fixing element 34 is accessible through the insertion opening 28. The fixing element 34 is typically an ISOFIX retaining bracket connected to a vehicle body of a vehicle.

The notches 32 have a respective end section 36, which is dimensioned in such a way that the guide element 18 is fixable in a formfitting and/or friction-locked manner on the fixing element 34 accommodated in the notches 32, in particular is fixable like a clip. For this purpose, a cross-sectional constriction 38 is provided in the notches 32 at the end section 36.

A fastening element 42 is attached on an outer side 40 of the base section 22. The fastening element 42 can also be formed in one piece with the base section 22 of the guide element 18. The fastening element 42 has a fastening opening 44. A tab 46 can be guided through the fastening opening 44. A tab 46 can be guided through the fastening opening 18. In this way, the guide element 18 can be connected to the tab 46. In this case, a front free end 48 of the tab 46 is inserted or threaded through the fastening opening 44 of the fastening element 42. In a mounted state of the guide element 18 on the seat cushion 12 (FIG. 1), the free end 48 of the tab 46 is arranged below the base section 22 of the guide element and is not visible from the outside (from the vehicle interior).

Figure 3:
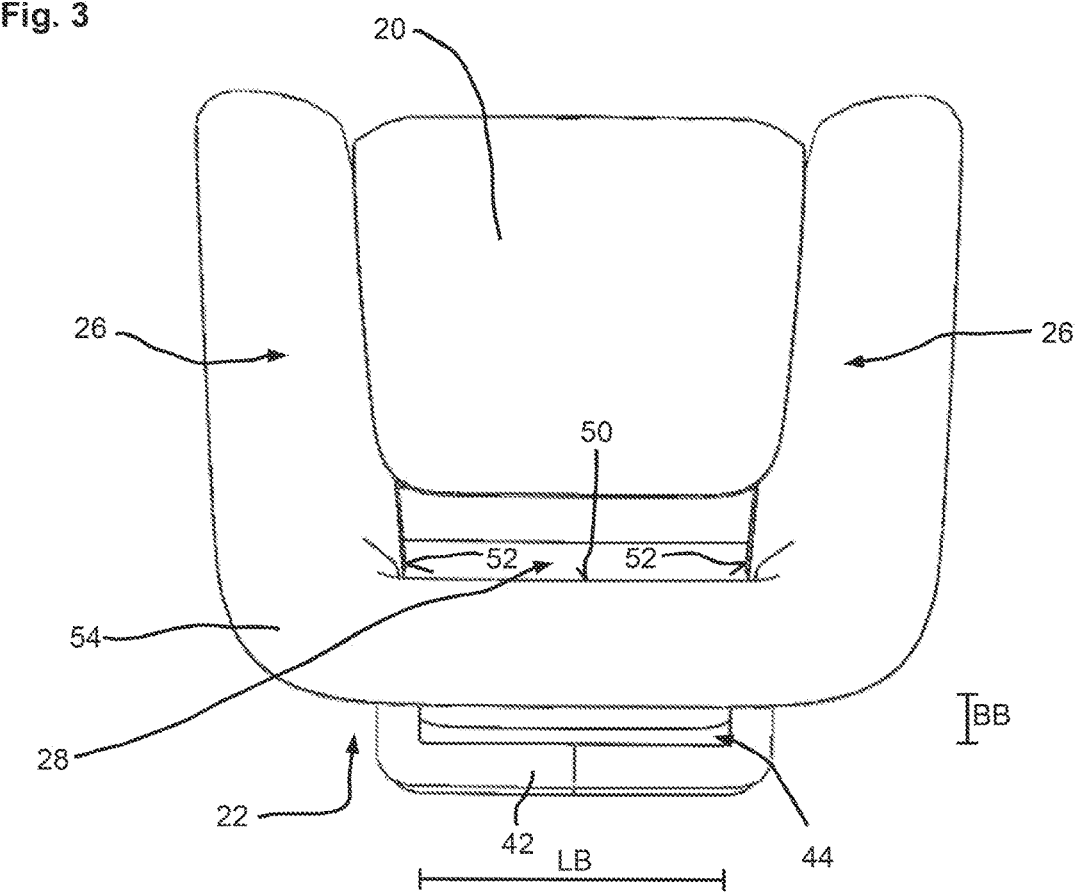
FIG. 3 shows a schematic and simplified perspective illustration of the guide element of FIG. 2 from the front.

FIG. 3 shows the guide element 18 of FIG. 2 in a perspective front view. A bead 54 connected to the base section 22 and the side sections 26 is apparent, wherein the bead conceals the base section 22 and the side sections 26 in this illustration, which is illustrated by the partially dashed reference lines for the reference signs 22, 26. As already mentioned, the insertion opening 28 is delimited by an inner side 50 of the base section 22 and by the respective inner sides 52 of the side sections 26. As in FIG. 2, the cover element 20 is shown in a partially open position. Accordingly, the view into the insertion opening 28 is also only partially uncovered.

Furthermore, the fastening element 42 is shown in FIG. 3, which adjoins the lower side 48 of the base section 22. The fastening opening 44 provided in the fastening element 42 is only partially visible. It is covered by the bead 54. The bead 54 typically rests on a cover of the seat cushion 12 in the mounted state of the guide element 18.

Figure 4:
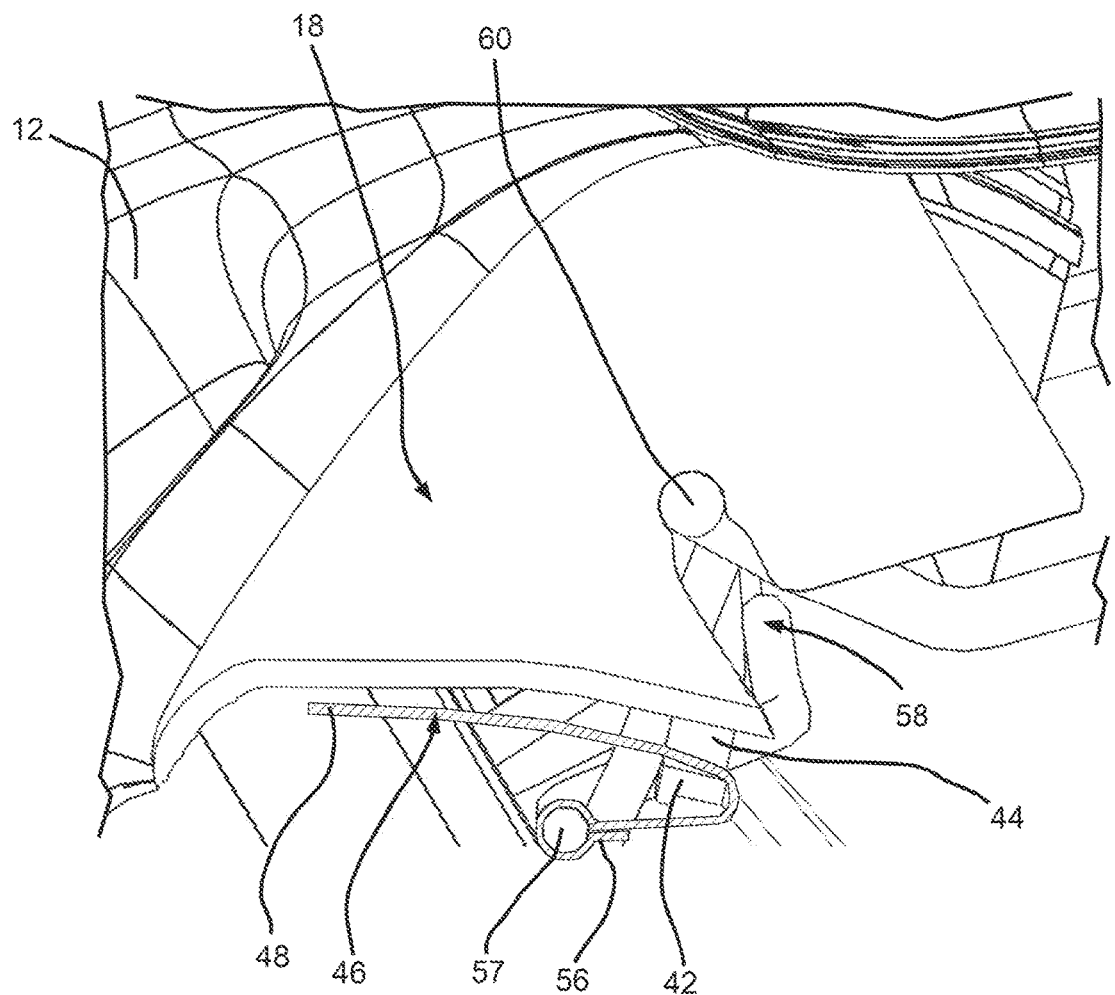
FIG. 4 shows a simplified and schematic sectional illustration of a guide element accommodated in the seat cushion having schematically indicated arrangement of a tab connected to the wire mesh of the seat cushion.

FIG. 4 shows a perspective illustration in partial section of the guide element 18 in its mounted state on the seat cushion 12. The guide element 18 is connected by means of the tab 46 to the seat cushion 12. In this case, the front free end 48 of the tab 46 is guided through the fastening opening 44 of the fastening element 42. A rear free end 56 of the tab 46 is connected to a support structure 58 of the seat cushion 12. The support structure 58 is embodied here by way of example as a wire mesh or wire frame 58. Instead of a wire mesh 58, alternatively or additionally, a support structure made of a plastic, for example, in the form of a plastic frame, can also be used. In particular, the rear free end 56 of the tab is guided in a loop around a wire 57 of the wire mesh 58. Alternatively or additionally, the tab 46 or its rear free end 56 can also be connected, for example, sewn or adhesively bonded, to a cover of the seat cushion. A further option is that the tab will be or is fastened by means of a metal or plastic eye on the wire frame 58. The seat cushion 12 can then be provided with the guide element 18 fastened by means of the tab as a unit during the mounting of the vehicle seat in a vehicle. The time-consuming, subsequent insertion and fastening of the guide element 18 when the seat cushion 12 is already mounted is accordingly dispensed with.

The fixing element 34 or the ISOFIX retaining bracket is also shown in FIG. 4. The fixing element comprises in particular two leg sections 60 and a coupling section 62 connecting the leg sections 60. The coupling section 62 extends transversely, in particular orthogonally, to the leg sections 60. The coupling section 62 extends through the guide element 18, in particular through its interior. The guide element 18, as already described above with reference to FIG. 2, is fastened in a formfitting manner on the coupling section 62 of the retaining bracket 34.

Figure 5:
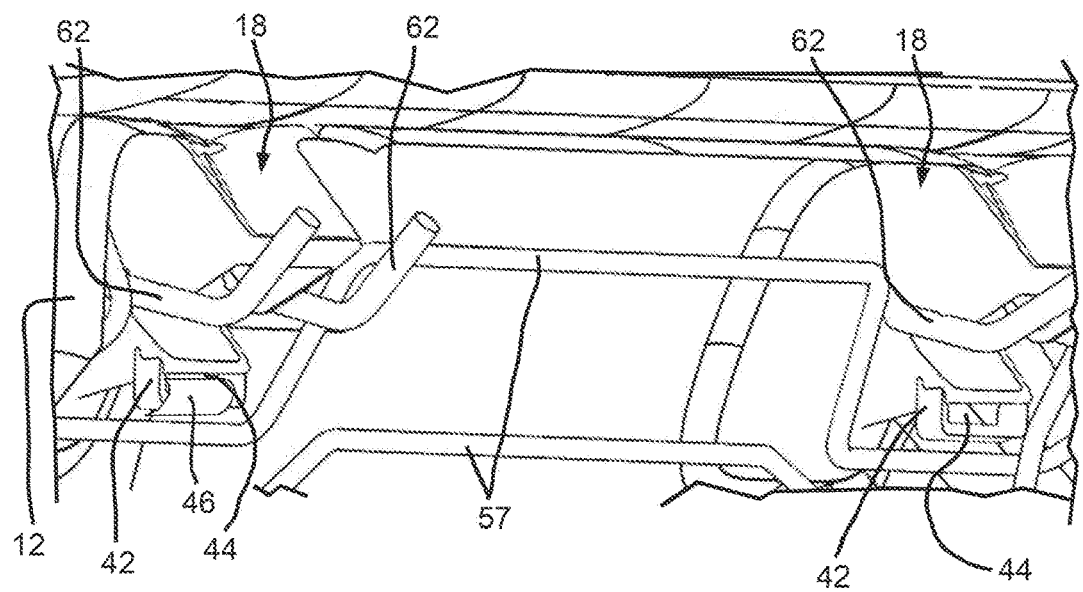
FIG. 5 shows a schematic and simplified perspective view of the rear side of a seat cushion having partially shown wire mesh, partially shown fixing elements, and two guide elements.

The fastening opening 44 is formed essentially rectangular, which is apparent in particular from the rear perspective view of FIG. 5 and FIG. 3. In this case, the fastening opening 44 can have a length LB which is approximately four times the width BB of the fastening opening 44. For example, the length LB of the opening can be approximately 35-50 mm, wherein the width LB or height is approximately 9 to 12 mm. In this way, a tab 46 adequately dimensioned for good handling can be inserted easily into the fastening opening 44, so that the guide element 18 can be connected to the seat cushion 12.

FIG. 5 shows the rear perspective view of two guide elements 18 of the seat cushion 12. The guide elements 18 are suspended on the two fixing elements or retaining brackets 34. In this illustration, furthermore wires 57 of the wire mesh or wire frame 58 are apparent. The support structure formed here by way of example as the wire mesh 58 is used to stabilize a foam element (not shown in greater detail) of the seat cushion 12. Furthermore, such a support structure can also be used to connect the seat cushion 12 to the vehicle body of the vehicle. In the left guide element 18, the tab 46 is shown in simplified form, which connects the guide element 18 to the wire 57 of the wire mesh 58 and thus to the seat cushion 12.

The invention claimed is:

1. A guide element, in particular ISOFIX guide element, comprising:
 a base section, a rear side section, and two side sections connected to the base,
 an insertion opening, which is delimited by respective inner sides of the base section and the two side sections, a bracket opening formed between the base section and the rear side section, which has notches formed in the side sections in such a way that a bracket-like fixing element can be accommodated in the notches, and in that the fixing element is accessible through the insertion opening,
 wherein at least one fastening element protruding from the base section is arranged on an outer side of the base section, wherein the fastening element has at least one oblong-hole-type fastening opening, which is connectable to a tab of a seat cushion or a seat cover of a vehicle seat.

2. The guide element as claimed in claim 1, wherein the fastening opening is embodied to be essentially rectangular, wherein a length of the fastening opening is approximately four times the width of the fastening opening.

3. The guide element according to claim 1, wherein the notches have a respective end section, which is dimensioned in such a way that the guide element is fixable in a formfitting and/or friction-locked manner on the fixing element accommodated in the notches, in particular is fixable like a clip.

4. A seat cushion for a seat of a vehicle, comprising:
 a foam body;
 a support structure arranged on the foam body;
 a cover enclosing the foam body;
 wherein at least one tab connected to the support structure and/or the cover is arranged on a rear region of the seat cushion, and in that a ISOFIX guide element, including a base section, a rear side section, and two side sections connected to the base,
 an insertion opening, which is delimited by respective inner sides of the base section and the two side sections, a bracket opening formed between the base section and the rear side section, which has notches formed in the side sections in such a way that a bracket-like fixing element can be accommodated in the notches, and in that the fixing element is accessible through the insertion opening,
 wherein at least one fastening element protruding from the base section is arranged on an outer side of the base section, wherein the fastening element has at least one oblong-hole-type fastening opening, which is connectable to a tab of a seat cushion or a seat cover of a vehicle seat is connected to the tab.

5. The seat cushion as claimed in claim 4, wherein it has two tabs, which are arranged at a distance to one another along a rear region of the seat cushion, which essentially corresponds to a distance of two bracket-like fixing elements connected to a vehicle body, in particular the distance of 270 to 290 mm between two ISOFIX retaining brackets.

6. The seat cushion as claimed in claim 4, wherein the tab has a length which is dimensioned so that a free end which is guided through the fastening opening of the fastening element, is arranged below the base section of the guide element in the mounted state of the guide element on the seat cushion.

7. The guide element according to claim 2, wherein the notches have a respective end section, which is dimensioned in such a way that the guide element is fixable in a formfitting and/or friction-locked manner on the fixing element accommodated in the notches, in particular is fixable like a clip.

8. The seat cushion as claimed in claim 5, wherein the tab has a length which is dimensioned so that a free end which is guided through the fastening opening of the fastening element, is arranged below the base section of the guide element in the mounted state of the guide element on the seat cushion.

* * * * *